United States Patent [19]
Saito

[11] Patent Number: 5,652,926
[45] Date of Patent: Jul. 29, 1997

[54] DISTANCE MEASURING APPARATUS

[75] Inventor: Tatsuo Saito, Saitama, Japan

[73] Assignee: Fuji Photo Optical Co., Ltd., Saitama, Japan

[21] Appl. No.: 654,603

[22] Filed: May 29, 1996

Related U.S. Application Data

[63] Continuation-in-part of Ser. No. 357,431, Dec. 14, 1994, Pat. No. 5,589,910.

[30] Foreign Application Priority Data

| Dec. 15, 1993 | [JP] | Japan | 5-315431 |
| Dec. 15, 1993 | [JP] | Japan | 5-315441 |
| Dec. 15, 1993 | [JP] | Japan | 5-315458 |
| Dec. 15, 1993 | [JP] | Japan | 5-315461 |
| May 30, 1995 | [JP] | Japan | 7-131566 |

[51] Int. Cl.$^6$ ............................................. G03B 13/36
[52] U.S. Cl. .................. 396/97; 396/98; 396/104; 396/106; 396/147
[58] Field of Search ..................... 396/97, 98, 104, 396/106, 125, 147

[56] References Cited

U.S. PATENT DOCUMENTS 4,518,242  5/1985  Toyama .
4,592,638  6/1986  Kaneda et al. .

FOREIGN PATENT DOCUMENTS 3141311  6/1991  Japan .
4184112  7/1992  Japan .

*Primary Examiner*—W. B. Perkey
*Attorney, Agent, or Firm*—Leydig, Voit & Mayer

[57] ABSTRACT

A distance measuring apparatus for measuring a distance to an object, which comprises an active distance measuring unit, a passive distance measuring unit, a parameter determining unit, a memory and a distance-value selecting circuit. The memory stores a distance measurement value look-up table and a parameter look-up table. The distance-value selecting circuit outputs an active distance measurement value or a passive distance measurement value as a distance to the object on the basis of first type active and passive distance measurement points picked up from the distance measurement value look-up table and second type active and passive distance measurement points picked up from the parameter look-up table.

5 Claims, 6 Drawing Sheets

Fig.5A

| ACTIVE DISTANCE MEASUREMENT VALUE dA [m] | ACTIVE DISTANCE MEASUREMENT POINT Pda | PASSIVE DISTANCE MEASUREMENT POINT Pdp |
|---|---|---|
| ~2.0 | 10 | 6 |
| 2.0~2.4 | 9 | 6 |
| 2.4~3.0 | 8 | 8 |
| 3.0~4.0 | 3 | 8 |
| 4.0~ | 0 | 8 |

Fig.5B

| LUMINANCE Lv [Lv] | ACTIVE DISTANCE MEASUREMENT POINT PLa | PASSIVE DISTANCE MEASUREMENT POINT PLp |
|---|---|---|
| ~2 | 10 | 3 |
| 2~4 | 10 | 5 |
| 4~13 | 10 | 10 |
| 13~15 | 8 | 10 |
| 15~ | 0 | 8 |

| TEMPERATURE Te [°C] | ACTIVE DISTANCE MEASUREMENT POINT $P_{Ta}$ | PASSIVE DISTANCE MEASUREMENT POINT $P_{Tp}$ |
|---|---|---|
| ~−10 | 3 | 3 |
| −10~0 | 6 | 6 |
| 0~30 | 10 | 10 |
| 30~40 | 8 | 8 |
| 40~ | 3 | 3 |

| STATE DETERMINATION FLAG | ACTIVE DISTANCE MEASUREMENT POINT $P_{Ea}$ | PASSIVE DISTANCE MEASUREMENT POINT $P_{Ep}$ |
|---|---|---|
| NORMAL CONTRAST Co, NORMAL DISTANCE MEASUREMENT RESULT Re | 10 | 10 |
| LOW CONTRAST Co, NORMAL DISTANCE MEASUREMENT RESULT Re | 10 | 8 |
| ABNORMAL DISTANCE MEASUREMENT RESULT Re (IMPOSSIBLE DISTANCE MEASUREMENT/FAILURE) | 0 | 0 |

DISTANCE MEASURING APPARATUS

RELATED APPLICATIONS

This is a continuation-in-part application of application Ser. No. 08/357,431 filed on Dec. 14, 1994, now U.S. Pat. No. 5,589,910.

BACKGROUND OF THE INVENTION

1. Field of the Invention

The present invention relates to a distance measuring apparatus which automatically measures a distance to an object.

2. Related Background Art

As distance measuring apparatuses, a distance measuring apparatus of an active method and a distance measuring apparatus of a passive method have been known. The active and passive methods are types of trigonometric distance measurement methods. In the active method, light is irradiated on an object from an infrared-emitting diode or the like, and the incident position of the reflected light is detected by a linear light-receiving portion such as a divided photodiode or a PSD (position-detecting semiconductor device) to calculate the distance to the object on the basis of the incident position of the reflected light. On the other hand, in the passive method, no light is irradiated on the object. Instead of this, the reflected light of natural light by the object is received by two linear sensors to calculate the distance to the object on the basis of a phase difference between outputs from the respective linear sensors.

In the distance measuring apparatus of the active method, since light is irradiated on the object, the distance can be advantageously measured even at a dark place. To the contrary, when the luminance of the object is higher than that of the irradiation light, the distance measuring apparatus cannot properly receive the reflected light, and a situation may be caused in which the distance measurement becomes impossible or a high distance measurement accuracy cannot be obtained. On the other hand, the distance measuring apparatus of the passive method advantageously requires no light source for emitting irradiation light. To the contrary, when the luminance of the object is low or the object is of a low contrast, the phase difference is difficult to detect, and a situation may be caused in which the distance measurement becomes impossible or a high distance measurement accuracy cannot be obtained. In this manner, the respective distance measurement methods have merits and demerits.

SUMMARY OF THE INVENTION

The present invention has been made in consideration of the above problems of the distance measuring apparatuses, and has as its object to provide a distance measuring apparatus which can perform distance measurement with a high accuracy.

The present invention is directed to a distance measuring apparatus used in optical instruments such as cameras. The distance measuring apparatus is preferably utilized particularly in an automatic focusing mechanism of the camera, and the like.

The present invention provides a distance measuring apparatus for measuring a distance to an object, which comprises:

an active distance measuring unit for irradiating first light to the object, and detecting the first light reflected by the object to obtain an active distance measurement value on the basis of a detected signal;

a passive distance measuring unit for detecting two light beams from the object which pass through paths different from each other, thereby obtaining a passive distance measurement value on the basis of detected signals;

a parameter determining unit for obtaining a parameter determination value about a parameter representing a distance measurement environment;

a memory for storing a distance measurement value look-up table and a parameter look-up table, said distance measurement value look-up table showing a relationship among active distance measurement values, first type active distance measurement points and first type passive distance measurement points which have been preset in correspondence with the active distance measurement values so as to represent the respective superiorities of the active distance measuring unit and the passive distance measuring unit, said parameter look-up table showing a relationship among parameter determination values, second type active distance measurement points and second type passive distance measurement points which have been preset in accordance with the parameter determination values so as to represent the respective superiorities of the active distance measuring unit and the passive distance measuring unit; and a distance-value selecting circuit for accessing the memory, picking up a first type active distance measurement point and a first type passive distance measurement point from the distance measurement value look-up table in correspondence with an active distance measurement value output from the active distance measuring unit, picking up a second type active distance measurement point and a second type passive distance measurement point from the parameter look-up table in correspondence with a parameter determination value output from the parameter determining unit, adding the first type and the second type active distance measurement points to obtain an active total addition value, adding the first type and the second type passive distance measurement points to obtain a passive total addition value, and comparing the active total addition value with the passive total addition value to output the active distance measurement value as the distance to the object when the active distance measurement value is determined to have a higher accuracy than the passive distance measurement value, and to output the passive distance measurement value as the distance to the object when the passive distance measurement value is determined to have a higher accuracy than the active distance measurement value.

At least one type of parameter selected from the group consisting of luminance of the object, ambient temperature, contrast of the object, and presence/absence of abnormalities in the active distance measuring unit and the passive distance measuring unit, is preferably employed as the parameter.

According to the present invention, it is preferable to employ, as the parameter determining unit, at least one determining unit selected from the group consisting of:

a luminance determining unit for detecting light from the object to determine the luminance of the object on the basis of a detected signal;

a temperature determining unit for detecting a temperature to determine the ambient temperature on the basis of a detected signal;

a contrast determining unit for determining the contrast of the object on the basis of the luminance of the object obtained by the luminance determining unit; and an abnormality determining unit for determining the presence/absence of abnormalities in the active distance measuring unit and the passive distance measuring unit on the basis of the active and passive distance measurement values obtained from the active and passive distance measuring units, respectively.

Further, according to the present invention, it is preferable to employ, as the parameter look-up table, at least one look-up table selected from the group consisting of:

a luminance look-up table showing a relationship among luminances of the object, second type active distance measurement points and second type passive distance measurement points which have been preset in correspondence with the luminances so as to represent the respective superiorities of the active distance measuring unit and the passive distance measuring unit;

a temperature look-up table showing a relationship among ambient temperatures, second type active distance measurement points and second type passive distance measurement points which have been preset in correspondence with the temperatures so as to represent the respective superiorities of the active distance measuring unit and the passive distance measuring unit;

a contrast look-up table showing a relationship among contrasts of the object, second type active distance measurement points and second type passive distance measurement points which have been preset in correspondence with the contrasts so as to represent the respective superiorities of the active distance measuring unit and the passive distance measuring unit; and a distance measurement abnormality look-up table showing a relationship among presence/absence of abnormalities in the active distance measuring unit and the passive distance measuring unit, second type active distance measurement points and second type passive distance measurement points which have been preset in correspondence with the presence/absence of the abnormalities so as to represent the respective superiorities of the active distance measuring unit and the passive distance measuring unit.

In the distance measuring apparatus of the present invention, after the distance to the object (active distance measurement value) is measured by the active distance measuring unit, an active distance measurement point of the first type representing the superiority of the active distance measuring unit, and a passive distance measurement point of the first type representing the superiority of the passive distance measuring unit are set in correspondence with the distance measurement value. Further, active distance measurement points of the second type representing the superiority of the active distance measuring unit and passive distance measurement points of the second type representing the superiority of the passive distance measuring unit are set in correspondence with various parameters such as the measured luminance of the object, the measured ambient temperature, the measured contrast of the object. When a plurality of parameters are selected, such points of the second type are set in correspondence with the parameters, respectively. The addition value of the active distance measurement points of the first and second types for the active distance measuring unit is compared with the addition value of the passive distance measurement points of the first and second types for the passive distance measuring unit on the basis of a predetermined determination algorithm to check a distance measuring unit which has a highly accurate distance measurement value.

The distance measuring apparatus of the present invention may further comprise a warning device electrically connected to the distance-value selecting circuit. In this case, when both the active and passive total addition values do not reach a predetermined reference value, the distance-value selecting circuit outputs a warning signal, and the warning device generates a warning on the basis of the warning signal.

In the distance measuring apparatus of the present invention having the warning device, when highly accurate distance measurement is difficult by any of the active distance measuring unit and the passive distance measuring unit, an operator (photographer) can instantaneously recognize that the distance measurement value may not always be accurate.

Further, the present invention provides a camera which comprises:

the distance measuring apparatus of the present invention;

a camera case;

a lens for taking the object;

a lens moving mechanism mounted on the case and the lens to move the lens relative to the case;

a motor for driving the lens moving mechanism;

a release mounted on the case; and a motor driving device which is electrically connected to the distance measuring apparatus, the motor and the release, and, when the release is depressed, drives the motor in accordance with the active distance measurement value or the passive distance measurement value output from the distance-value selecting circuit of the distance measuring apparatus, thereby moving the lens to a position where an image of the object is focused on a film set in the case.

In the camera of the present invention, since a highly accurate distance measurement value can always be obtained by the distance measuring apparatus of the present invention, occurrence of inconveniences such as a focal position error caused by a distance measurement error, and an increase in taking time can be sufficiently prevented.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5A shows an example of a distance measurement value look-up table according to the present invention, and FIGS. 5B, 5C and 5D show examples of parameter look-up tables according to the present invention, respectively.

DETAILED DESCRIPTION OF THE PREFERRED EMBODIMENT

An embodiment of a distance measuring apparatus according to the present invention will be described below with reference to the accompanying drawings. In this embodiment, a distance measuring apparatus incorporated in a camera will be explained.

Figure 1:
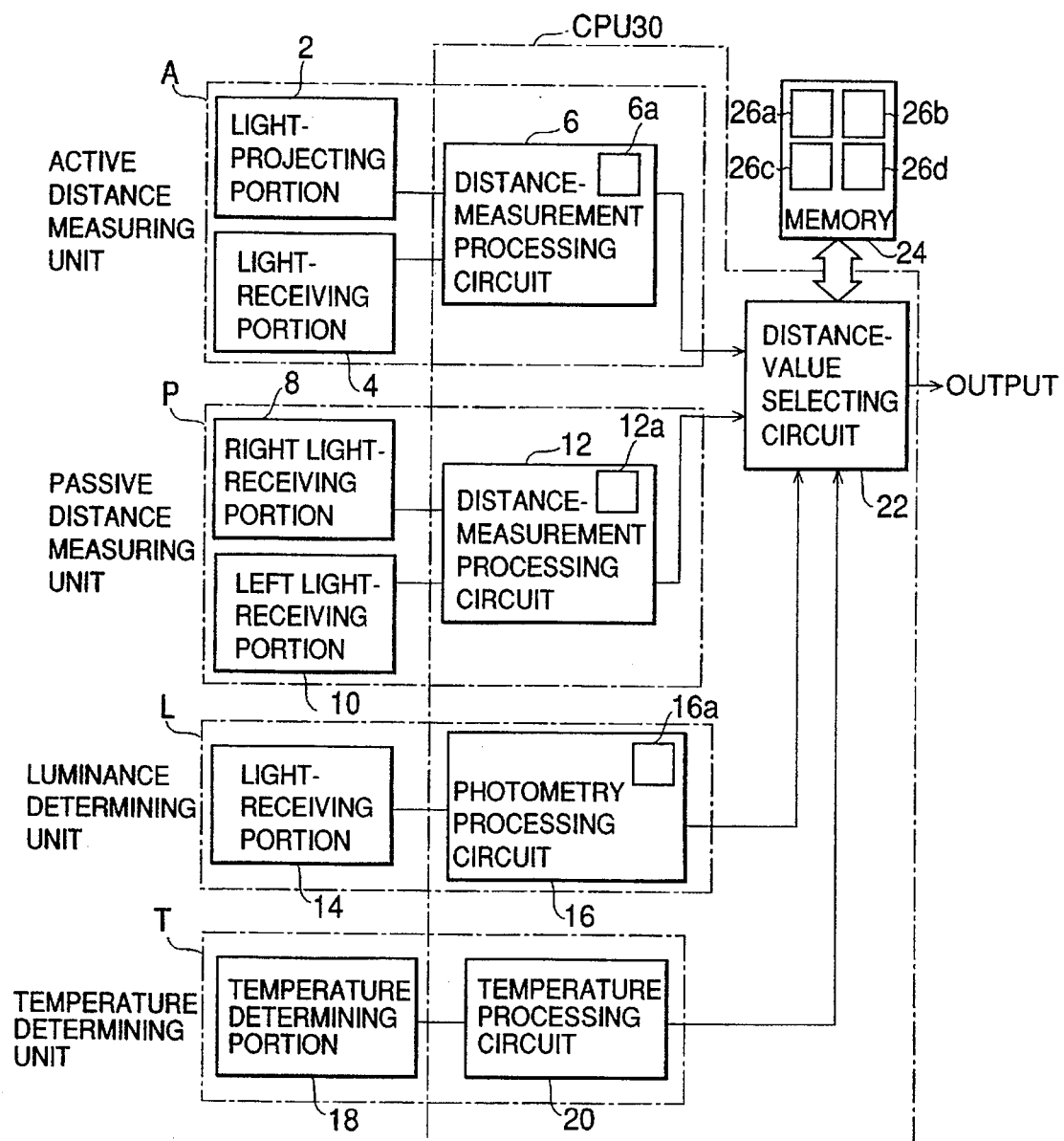
FIG. 1 is a block diagram for explaining the arrangement of a distance measuring apparatus according to an embodiment of the present invention.

Referring to FIG. 1, this distance measuring apparatus comprises a distance measuring unit A of the active method (to be referred to as an active distance measuring unit hereinafter) using the principle of trigonometry, a distance measuring unit P of the passive method (to be referred to as a passive distance measuring unit hereinafter) using the principle of trigonometry, a luminance determining unit L for measuring the luminance of an object, and a temperature determining unit T for measuring an ambient temperature.

Figure 2:
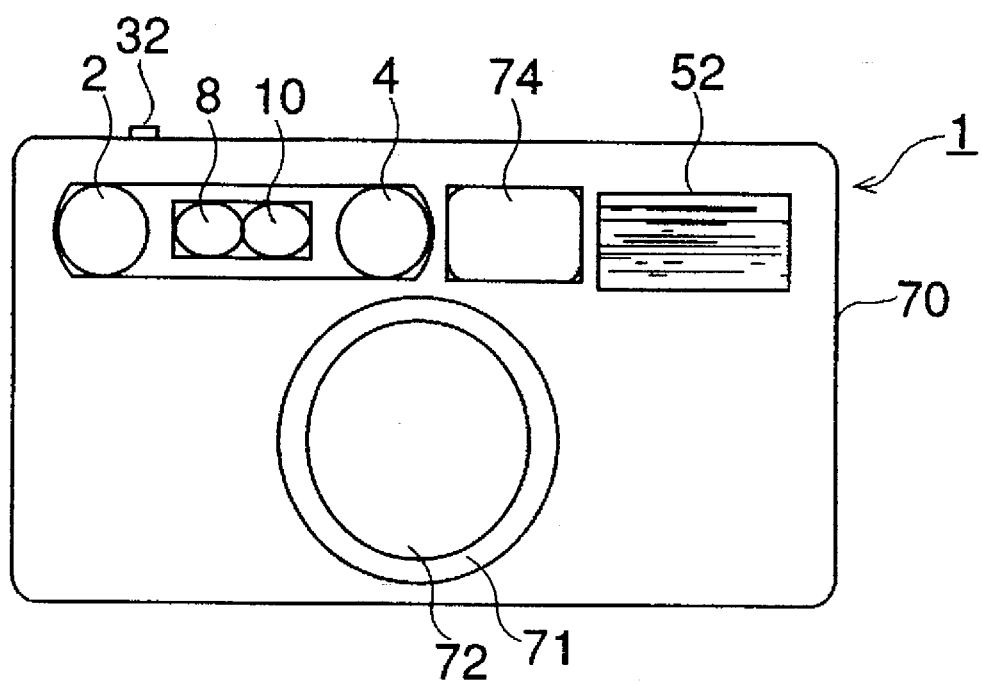
FIG. 2 is a view showing the outer appearance of a camera according to an embodiment of the present invention having the distance measuring apparatus of the present invention.

The active distance measuring unit A comprises a light-projecting portion 2, a light-receiving portion 4 and a distance-measurement processing circuit 6. The light-projecting portion 2 has an infrared-emitting diode or the like which irradiates light (first light) on the object. The light-receiving portion 4 has a PSD (position-detecting semiconductor device) or the like which receives the reflected light of the irradiation light by the object to detect its incident position. The distance-measurement processing circuit 6 obtains the distance to the object (active distance measurement value) from the detected incident position of the reflected light on the basis of the principle of trigonometry. As shown in FIG. 2, the light-projecting portion 2 and the light-receiving portion 4 are arranged on the front surface of a camera main body 1 at a predetermined interval (baseline).

The passive distance measuring unit P comprises right and left light-receiving portions 8 and 10 respectively having linear image sensors, such as line CCDs (charge-coupled devices), which mainly receive the reflected light of natural light by the object. As shown in FIG. 2, the light-receiving portions 8 and 10 are arranged between the light-projecting and light-receiving portions 2 and 4 with predetermined distances. A distance-measurement processing circuit 12 calculates the distance to the object (passive distance measurement value) on the basis of the phase difference between outputs from the light-receiving portions 8 and 10.

The luminance determining unit L comprises a light-receiving portion 14 having a light-receiving element such as a CdS, and a photometry processing circuit 16 for obtaining the luminance of the object on the basis of an output from the light-receiving portion 14.

The temperature determining unit T comprises a temperature determining portion 18 having a temperature sensor, and a temperature processing circuit 20 for obtaining an ambient temperature on the basis of an output from the temperature determining portion 18.

The distance measuring apparatus shown in FIG. 1 further comprises abnormality determining units 6a and 12a, and a contrast determining unit 16a. The abnormality determining units 6a and 12a respectively determine the presence/absence of abnormalities in the distance measuring units A and P on the basis of an active distance measurement value obtained by the active distance measuring unit A and a passive distance measurement value obtained by the passive distance measuring unit P. The contrast determining unit 16a determines the contrast of the object on the basis of the luminance of the object obtained by the luminance determining unit L.

In the distance measuring apparatus shown in FIG. 1, the abnormality determining units 6a and 12a are respectively arranged in the distance-measurement processing circuits 6 and 12. When distance measurement value data varies within a predetermined range in accordance with the obtained distance measurement value data, and the distance measuring unit has no failure or the distance measurement is not impossible, each abnormality determining unit determines that the distance measuring unit is not abnormal (is normal). When the distance measurement data varies beyond the predetermined range, the distance measuring unit has a failure, or the distance measurement is impossible, each abnormality determining unit determines that the distance measuring unit is abnormal.

In the distance measuring apparatus shown in FIG. 1, the contrast determining unit 16a is arranged in the photometry processing circuit 16. When luminance data varies within a predetermined range in accordance with the obtained luminance data of the object (the luminance is uniform), the contrast determining unit 16a determines that the object is of a low contrast. When the luminance data varies beyond the predetermined range, the contrast determining unit 16a determines that the contrast is normal.

The distance-measurement processing circuits 6 and 12, the photometry processing circuit 16 and the temperature processing circuit 20 are electrically connected to a distance-value selecting circuit 22, which is further electrically connected to a memory 24. As shown in FIGS. 5A to 5D, the memory 24 stores (i) a distance measurement value lock-up table 26a (FIG. 5A), (ii) a luminance look-up table 26b (FIG. 5B), (iii) a temperature look-up table 26c (FIG. 5C), (iv) a contrast look-up table 26d (FIG. 5D) and (v) a distance measurement abnormality look-up table 26d (FIG. 5D).

The distance measurement value look-up table 26a shows the relationship between active distance measurement values dA, and active and passive distance measurement points $P_{da}$ and $P_{dp}$ of the first type which are preset in correspondence with the active distance measurement values dA so as to represent the respective superiorities of the active and passive distance measuring units A and P.

The luminance look-up table 26b shows the relationship between luminances Lv of the object, and active and passive distance measurement points $P_{La}$ and $P_{Lp}$ of the second type which are preset in correspondence with the luminances Lv so as to represent the respective superiorities of the active and passive distance measuring units A and P.

The temperature look-up table 26c shows the relationship between ambient temperatures Te, and active and passive distance measurement points $P_{Ta}$ and $P_{Tp}$ of the second type which are preset in correspondence with the temperatures Te so as to represent the respective superiorities of the active and passive distance measuring units A and P.

The contrast look-up table 26d shows the relationship between contrasts Co of the object, and active and passive distance measurement points $P_{Ea}$ and $P_{Ep}$ of the second type which are preset in correspondence with the contrasts Co so as to represent the respective superiorities of the active and passive distance measuring units A and P.

The distance measurement abnormality look-up table 26d shows the relationship between the presence/absence of abnormalities (normal/abnormal distance measurement results) Re in the active and passive distance measuring units A and P, and the active and passive distance measurement points $P_{Ea}$ and $P_{Ep}$ of the second type which are preset in correspondence with the presence/absence of abnormalities Re so as to represent the respective superiorities of the active and passive distance measuring units A and P.

In FIG. 5D, the contrast look-up table and the distance measurement abnormality look-up table are integrally formed. The luminance look-up table 26b (FIG. 5B), the temperature look-up table 26c (FIG. 5C), the contrast look-up table 26d (FIG. 5D) and the distance measurement abnormality look-up table 26d (FIG. 5D) constitute a parameter look-up table according to the present invention.

Figure 4:
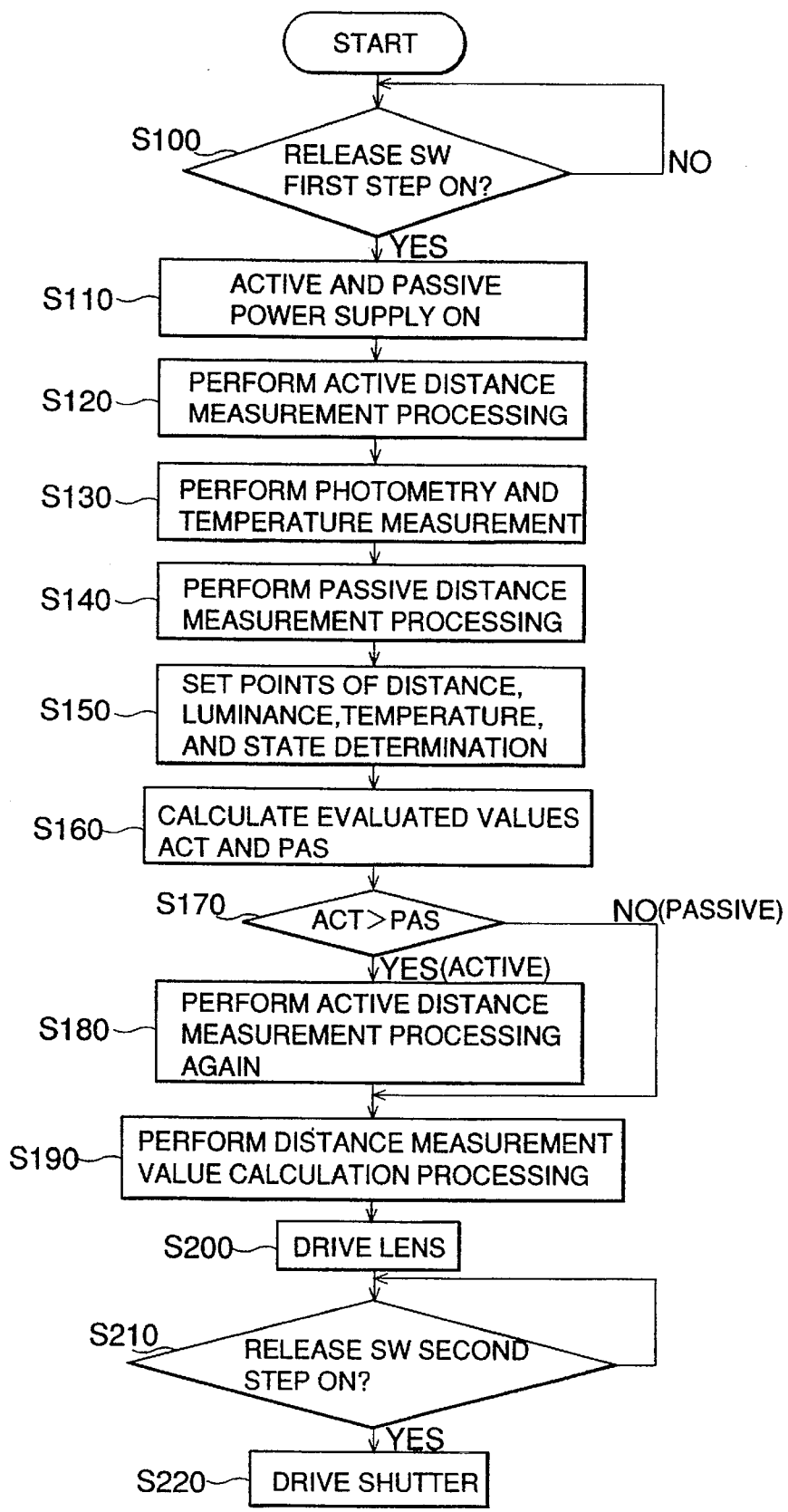
FIG. 4 is a flow chart for explaining an example of the operation of the distance measuring apparatus of the present invention.

The distance-value selecting circuit 22 can access the memory 24 following a flow chart shown in FIG. 4 (to be described later). With this access, $P_{da}$ and $P_{dp}$, $P_{La}$ and $P_{Lp}$, $P_{Ta}$ and $P_{Tp}$, and $P_{Ea}$ and $P_{Ep}$ can be picked up on the basis of the active distance measurement value dA, the luminance Lv, the ambient temperature Te, and the contrast Co and the presence/absence of abnormality Re, respectively. The distance-value selecting circuit 22 calculates the total addition value (ACT) of $P_{da}$, $P_{La}$, $P_{Ta}$ and $P_{Ea}$ and the total addition value (PAS) of $P_{dp}$, $P_{Lp}$, $P_{Tp}$ and $P_{Ep}$, and then compares ACT with PAS. When the result shows ACT>PAS, it is determined that the active distance measurement value dA has a higher accuracy than that of a passive distance measurement value dP, and the signal dA output from the active distance-measurement processing circuit 6 is output as a distance measurement value. When ACT<PAS, it is determined that the passive distance measurement value dP has a higher accuracy than the active distance measurement value dA, and the signal dP output from the passive distance-measurement processing circuit 12 is output as a distance measurement value. The distance-value selecting circuit 22 can output, as a distance measurement value, the addition average value of a plurality of active distance measurement values (signals dA, dA', ...) obtained upon completion of a plurality of times of active distance measurement, or the addition average value of a plurality of passive distance measurement values (signals dP, dP', ...) obtained upon completion of a plurality of times of passive distance measurement.

The measurement results of the processing circuits 6, 12, 16 and 20 are transferred to the distance-value selecting circuit 22. A distance measurement value (the distance to the object) having the highest accuracy is selected on the basis of a predetermined algorithm (to be described later).

Figure 3:
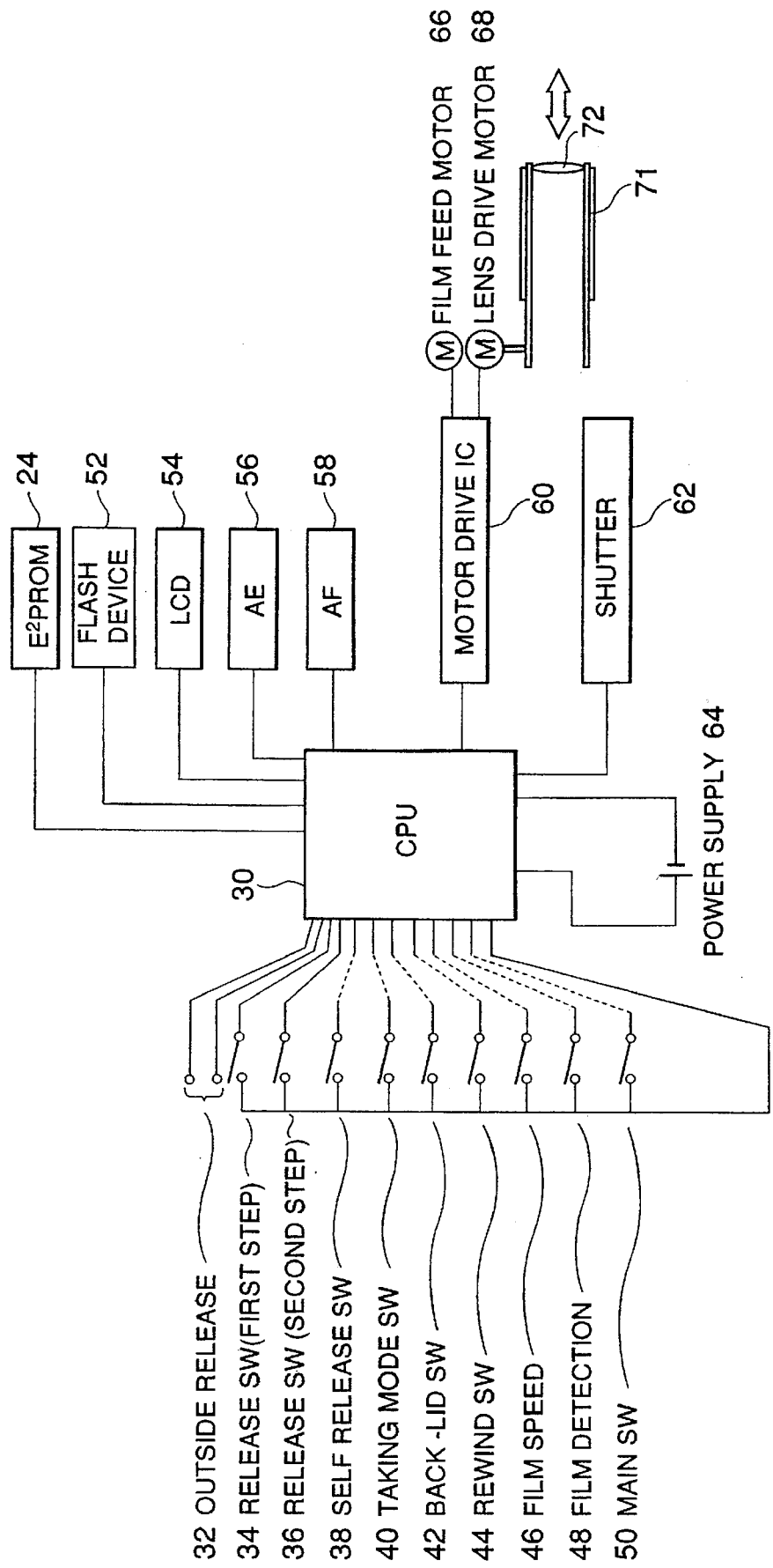
FIG. 3 is a block diagram showing an example of a system configuration incorporated in the camera of the present invention.

The camera 1 incorporates a microcomputer system (CPU) 30 as shown in FIG. 3. The distance measuring apparatus shown in FIG. 1 is also controlled by the microcomputer system 30.

FIG. 2 shows the outer appearance of an example of the camera of the present invention having the distance measuring apparatus according to this embodiment, and FIG. 3 schematically shows its internal mechanism. The distance-measurement processing circuits 6 and 12, the photometry processing circuit 16, the temperature processing circuit 20 and the distance-value selecting circuit 22, which are shown in FIG. 1, are arranged in the CPU 30 shown in FIG. 3. An outside release 32, a first release switch (first step) 34, a second release switch (second step) 36, a self release switch 38, a taking mode switch 40, a back-lid switch 42, a rewind switch 44, a film speed (film sensitivity) switch 46, a film detection switch 48 and a main switch 50 are electrically connected to the CPU 30. The E²PROM (memory) 24, a flash device 52, an LCD (liquid crystal color display) 54, an AE (automatic exposure system) 56, an AF (autofocusing system) 58, a motor drive IC (motor drive device) 60, a shutter 62 and a power supply 64 are electrically connected to the CPU 30. A film feed motor 66 and a lens drive motor 68 are electrically connected to the motor drive IC 60.

As shown in FIG. 2, the camera according to this embodiment comprises a camera case 70, a lens 72 which can be driven by the lens drive motor 68 through a lens moving mechanism 71, a viewfinder 74 which allows a photographer to visually check the object, and the like, which are members normally provided to an AF camera. Upon depression of the release 32, the motor drive IC 60 drives the motor 68 in accordance with the active distance measurement value dA or the passive distance measurement value dP output from the distance-value selecting circuit 22 of the distance measuring apparatus, thereby moving the lens 72 to a position where the object image is focused (formed) on a film set in the case 70.

The active distance measuring unit, the passive distance measuring unit, and the like in the distance measuring apparatus according to the present invention are described in detail in U.S. patent application Ser. No. 08/357,431, which is the original application of this CIP application. The U.S. patent application Ser. No. 08/357,431 is incorporated herein by reference. The principle of trigonometry is described in, e.g., Japanese Patent Application Laid-Open Gazettes Nos. 4-184112 (184112/92) and 3-141311 (141311/91).

Next, the operation of the distance measuring apparatus having the above arrangement will be described with reference to a flow chart in FIG. 4.

In step S100, the flow waits until the release switch 32 is depressed. When the release switch 32 is half-depressed (the SW 34 in the first step is depressed), the flow advances to step S110 to start processing. First of all, after operation power is supplied to the active and passive distance measuring units A and P (step S110), the distance is measured by the active distance measuring unit A (step S120). The luminance of the object is measured by the luminance determining unit L, and at the same time the ambient temperature is measured by the temperature determining unit T (step S130). Further, the distance is measured by the passive distance measuring unit P (step S140).

In step S150, the points $P_{da}$ and $P_{dp}$ respectively representing the superiorities of the active and passive distance measuring units A and P are set on the basis of the distance to the object measured by the active distance measuring unit A (active distance measurement value dA).

That is, the points $P_{da}$ and $P_{dp}$ have been experimentally evaluated as data corresponding to the active distance measurement values dA divided into a plurality of steps, and a larger value has a higher superiority. More specifically, when the distance measurement value dA exceeds 4.0 m, since the distance to the object is long, the passive distance measurement is apparently advantageous compared to the active distance measurement. Points in corresponding to dA>4.0 have been set to $P_{da}$=0 and $P_{dp}$=8. The points $P_{da}$ and $P_{dp}$ corresponding to the remaining distance measurement values dA have also been preset on the basis of the same analytic method. The points $P_{da}$ and $P_{dp}$ have been stored in advance in the E²PROM or the like in the form of the look-up table 26a. This look-up table 26a is retrieved to set in advance the points $P_{da}$ and $P_{dp}$ corresponding to the active distance measurement value dA measured actually. For the sake of descriptive simplicity, the points $P_{da}$ and $P_{La}$ corresponding to the active distance measurement values dA are called points of the first type.

In step S150, as shown in FIG. 5B, the points $P_{La}$ and $P_{Lp}$ representing the respective superiorities of the active and passive distance measuring units A and P are set on the basis of the luminance Lv measured by the luminance determining unit L. That is, the points $P_{La}$ and $P_{Lp}$ are also data which have been experimentally evaluated in advance and stored in advance in the E²PROM or the like in the form of the look-up table 26b. This look-up table 26b is retrieved to set the points $P_{La}$ and $P_{Lp}$ corresponding to the luminance Lv measured actually. More specifically, when the luminance Lv exceeds 15 [Lv], the passive distance measurement is apparently advantageous compared to the active distance measurement. Points corresponding to Lv>15 have been set to $P_{da}=0$ and $P_{dp}=8$. The points $P_{La}$ and $P_{Lp}$ corresponding to the remaining luminances Lv have been preset on the basis of the same analytic method.

As shown in FIG. 5C, the points $P_{Ta}$ and $P_{Tp}$ representing the respective superiorities of the active and passive distance measuring units A and P are set on the basis of the temperature measured by the temperature determining unit T. That is, the points $P_{Tp}$ and $P_{Tp}$ are data which have been experimentally evaluated in advance and stored in advance in the E²PROM or the like in the form of the look-up table 26c. The look-up table 26c is retrieved on the basis of the actually measured temperature. The reason the points $P_{Ta}$ and $P_{Tp}$ are set using the ambient temperatures as parameters is to consider a variation in characteristics caused by the temperature dependency of the distance measuring units A and P. If not particularly necessary, this processing may be omitted.

As shown in FIG. 5D, the distance-value selecting circuit 22 checks on the basis of outputs from the distance measuring units A and P, and the determining units L, T, 6a, 12a and 16a whether the environment is suitable for distance measurement (contrast Co and distance measurement result Re are each normal or abnormal).

That is, the distance-value selecting circuit 22 determines that the contrast of the object is normal, and the distance measurement result (distance measurement value dA) is a normal value within a preset range, that the object is of a low contrast, and the distance measurement result (distance measurement value dA) is a normal value within the preset range, or that the distance measuring unit A or P has a failure or the distance measurement is impossible. Then, the distance-value selecting circuit 22 sets "1" in a corresponding state determination flag.

The points $P_{Ea}$ and $P_{Ep}$ representing the respective superiorities of the active and passive distance measuring units A and P are set on the basis of the state determination flag provided with "1". The points $P_{Ea}$ and $P_{Ep}$ are data which have been experimentally evaluated in advance and stored in advance in the E²PROM or the like in the form of the look-up table 26d. A larger value represents a higher superiority. More specifically, when a state determination flag representing that the distance measuring unit A or P has a failure or the distance measurement is impossible is set, $P_{Ea}=P_{Ep}=0$ because the superiority has no essential meaning. In the remaining cases, experimentally evaluated values are set.

For the sake of descriptive simplicity, the points $P_{La}$, $P_{Lp}$, $P_{Ta}$, $P_{Tp}$, $P_{Ea}$ and $P_{Ep}$ corresponding to the parameters shown in FIGS. 5B to 5D, i.e., the parameters used to check whether the environment is suitable for distance measurement, are called points of the second type.

In step S160, the total addition value ACT of the points relating to the active distance measurement (=$P_{da}+P_{La}+P_{Ta}+P_{Ea}$), and the total addition value PAS of the points relating to the passive distance measurement (=$P_{dp}+P_{Lp}+P_{Tp}+P_{Ep}$), which are set in step S150, are obtained.

If only one point=0, the total addition value of the corresponding distance measurement is forcibly set to 0. More specifically, if the active distance measurement value is dA>4.0, $P_{da}=0$ and $P_{dp}=8$ from the relationship in FIG. 5A, so that the total addition value (evaluated value) of the active distance measurement is forcibly set to ACT=0. If no point=0 is present in the passive distance measurement, the total addition value (evaluated value) PAS of the passive distance measurement is calculated.

In this manner, the points of each distance measurement are added to obtain the total addition values ACT and PAS for determining the respective superiorities of the active and passive distance measurement as a whole.

When both the total addition values are ACT=PAS=0, or ACT<25 and PAS<25, it is determined that the state is not enough to measure the distance. The distance-value selecting circuit 22 outputs a warning signal (warning flag) to suggest that the microcomputer system (CPU) 30 should turn on the warning lamp of the LCD (warning device) 54.

In step S170, the total addition values ACT and PAS of the active and passive distance measurement are compared with each other. If ACT>PAS, it is determined that the active distance measurement has a higher superiority, and the flow shifts to step S180. If ACT≦PAS, it is determined that the passive distance measurement has a higher superiority, and the flow shifts to step S190.

More specifically, in FIGS. 5A to 5D, when the active distance measurement value dA is 3.0 to 4.0, the luminance Lv is 13 to 15, the temperature is 30 to 40, and the state determination flag is in the "normal contrast, normal distance measurement result" state, $$ACT=P_{da}+P_{La}+P_{Ta}+P_{Ea}=3+8+8+10=29$$

$$PAS=P_{dp}+P_{Lp}+P_{Tp}+P_{Ep}=8+10+8+10=36$$

Therefore, it is determined that the passive distance measurement has a higher superiority, and the flow shifts to step S190.

If the active distance measurement is selected, the distance is newly measured by the active distance measuring unit A in step S180, and in next step S190 the average value of the sum of a newly obtained distance measurement value dA' and the previously obtained distance measurement value dA is used as a true distance to the object. The average value may not be calculated, and the distance measurement value dA' may be used as the true distance.

On the other hand, if the passive distance measurement is selected in step S170, the distance measurement value dP obtained in step S140 is used as the true distance in step S190.

In this manner, both the effects of increasing the speed of distance measurement processing and improving the distance measurement accuracy are obtained by performing the active distance measurement twice and the passive distance measurement only once. In other words, a decrease in distance measurement time and an increase in speed of distance measurement processing are realized by performing the passive distance measurement only once because the calculation time required for the passive distance measurement is relatively longer than that for the active distance measurement. Meanwhile, the highly accurate distance measurement is realized by performing the active distance measurement twice.

Next, the focus lens 72 is driven on the basis of the selected distance measurement value to set a in-focus state (step S200). In this embodiment, after a home position is detected, the stepping motor 68 is driven by pulses having the number corresponding to the distance measurement value to move the focus lens 72 to the in-focus position.

If ACT=PAS=0, the focal position is set to be the infinity by setting the in-focus step of the focus lens 72 to 0.

After it is detected that the release switch 32 is depressed to the second step (step S210), the shutter and the like are driven to complete the taking processing (step S220).

In this manner, according to this embodiment, the points representing the superiorities of the active and passive distance measurement are set. It is checked as a whole from the addition values of these points which of distance measurement has a higher superiority, and then the employed distance measurement is performed. Therefore, the distance can always be measured with a high accuracy. Further, since the distance is determined on the basis of the distance measurement values which are actually obtained by the active and passive distance measuring units, the determination can be realized with a higher reliability.

The specific points shown in FIGS. 5A to 5D are a detailed example to explain this embodiment. The present invention also includes the case of changing the points to various values in accordance with a change in design specifications or the like. Further, the various parameters (see FIGS. 5B, 5C and 5D) used to check whether the environment is suitable for distance measurement are also a detailed example to explain this embodiment. Alternatively, other types of parameters may be selected to set predetermined points for them. The present invention also includes the case of selecting other types of parameters.

As has been described above, according to the present invention, the points representing the superiorities of the active and passive distance measurement are set, and it is checked as a whole from the addition values of these points which of distance measurement has a higher superiority. Therefore, even when the distance is to be measured at a dark place, or the distance to an object which is of a low contrast is to be measured, an optimal distance measurement state can always be automatically set to measure the distance with a high accuracy. Moreover, since the points are set on the basis of the distance measurement values which are actually obtained by the active and passive distance measuring units, determination can be realized with a higher reliability.

In particular, since the superiorities of the active and passive distance measurement are determined on the basis of the addition values of the above points, determination processing can be performed at a high speed even on the basis of many types of determination requirements (parameters). At the same time, since the determination processing is based on many types of determination requirements, an optimal distance measurement state can be determined as a whole with a high accuracy.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No. 315431/1993, 315441/1993, 315458/1993 and 315461/1993 all filed on Dec. 15, 1993, No. 131566/1995 filed on May 30, 1995 and the U.S. patent application Ser. No. 08/357431 filed on Dec. 14, 1994 are hereby incorporated by reference.

What is claimed is:

1. A distance measuring apparatus for measuring a distance to an object, which comprises:

an active distance measuring unit for irradiating first light to the object, and detecting the first light reflected by the object to obtain an active distance measurement value on the basis of a detected signal;

a passive distance measuring unit for detecting two light beams from the object which pass through paths different from each other, thereby obtaining a passive distance measurement value on the basis of detected signals;

a parameter determining unit for obtaining a parameter determination value about a parameter representing a distance measurement environment;

a memory for storing a distance measurement value look-up table and a parameter look-up table, said distance measurement value look-up table showing a relationship among active distance measurement values, first type active distance measurement points and first type passive distance measurement points which have been preset in correspondence with the active distance measurement values so as to represent respective superiorities of the active distance measuring unit and the passive distance measuring unit, said parameter look-up table showing a relationship among parameter determination values, second type active distance measurement points and second type passive distance measurement points which have been preset in accordance with the parameter determination values so as to represent respective superiorities of the active distance measuring unit and the passive distance measuring unit; and a distance-value selecting circuit for accessing the memory, picking up a first type active distance measurement point and a first type passive distance measurement point from the distance measurement value look-up table in correspondence with an active distance measurement value output from the active distance measuring unit, picking up a second type active distance measurement point and a second type passive distance measurement point from the parameter look-up table in correspondence with a parameter determination value output from the parameter determining unit, adding the first type and the second type active distance measurement points to obtain an active total addition value, adding the first type and the second type passive distance measurement points to obtain a passive total addition value, and comparing the active total addition value with the passive total addition value to output the active distance measurement value as the distance to the object when the active distance measurement value is determined to have a higher accuracy than the passive distance measurement value, and to output the passive distance measurement value as the distance to the object when the passive distance measurement value is determined to have a higher accuracy than the active distance measurement value.

2. A distance measuring apparatus according to claim 1, wherein the parameter is at least one type of parameter selected from the group consisting of luminance of the object, ambient temperature, contrast of the object, and presence/absence of abnormalities in the active distance measuring unit and the passive distance measuring unit.

3. A distance measuring apparatus according to claim 1, wherein the parameter determining unit is at least one determining unit selected from the group consisting of:

a luminance determining unit for detecting light from the object to determine a luminance of the object on the basis of a detected signal, a temperature determining unit for detecting a temperature to determine an ambient temperature on the basis of a detected signal, a contrast determining unit for determining a contrast of the object on the basis of the luminance of the object obtained by the luminance determining unit, and an abnormality determining unit for determining a presence/absence of abnormalities in the active distance measuring unit and the passive distance measuring unit on the basis of the active and passive distance measurement values obtained from the active and passive distance measuring units, respectively; and wherein the parameter look-up table is at least one look-up table selected from the group consisting of:

a luminance look-up table showing a relationship among luminances of the object, second type active distance measurement points and second type passive distance measurement points which have been preset in correspondence with the luminances so as to represent respective superiorities of the active distance measuring unit and the passive distance measuring unit, a temperature look-up table showing a relationship among ambient temperatures, second type active distance measurement points and second type passive distance measurement points which have been preset in correspondence with the temperatures so as to represent respective superiorities of the active distance measuring unit and the passive distance measuring unit, a contrast look-up table showing a relationship among contrasts of the object, second type active distance measurement points and second type passive distance measurement points which have been preset in correspondence with the contrasts so as to represent respective superiorities of the active distance measuring unit and the passive distance measuring unit, and a distance measurement abnormality look-up table showing a relationship among presence/absence of abnormalities in the active distance measuring unit and the passive distance measuring unit, second type active distance measurement points and second type passive distance measurement points which have been preset in correspondence with the presence/absence of the abnormalities so as to represent respective superiorities of the active distance measuring unit and the passive distance measuring unit.

4. A distance measuring apparatus according to claim 1, wherein the distance measuring apparatus further comprises a warning device which is electrically connected to the distance-value selecting circuit, and, when both the active and passive total addition values do not reach a predetermined reference value, the distance-value selecting circuit outputs a warning signal to make the warning device generate a warning on the basis of the warning signal.

5. A camera which comprises:

the distance measuring apparatus according to claim 1;

a camera case;

a lens for taking the object;

a lens moving mechanism mounted on the case and the lens to move the lens relative to the case;

a motor for driving the lens moving mechanism;

a release mounted on the case; and a motor driving device which is electrically connected to the distance measuring apparatus, the motor and the release, and which, when the release is depressed, drives the motor in accordance with the active distance measurement value or the passive distance measurement value output from the distance-value selecting circuit of the distance measuring apparatus, thereby moving the lens to a position where an image of the object is focused on a film set in the case.

* * * * *